(12) United States Patent
Triplett

(10) Patent No.: US 6,662,456 B1
(45) Date of Patent: Dec. 16, 2003

(54) DEVICE FOR MEASURING SURFACE PROJECTIONS ON SIDEWALLS OF PNEUMATIC TIRES

(75) Inventor: William E. Triplett, Monteagle, TN (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/564,165

(22) Filed: May 3, 2000

(51) Int. Cl.[7] .................................................. G01B 5/28
(52) U.S. Cl. ........................................... 33/203; 33/833
(58) Field of Search .............................. 33/203, 203.11, 33/533, 559, 832, 833

(56) References Cited

U.S. PATENT DOCUMENTS

| | | | | |
|---|---|---|---|---|
| 440,621 A | * | 11/1890 | Curran | 33/203.11 |
| 999,899 A | * | 8/1911 | Stanley | 33/833 |
| 1,346,748 A | * | 7/1920 | Hedges | 33/203.11 |
| 1,347,684 A | * | 7/1920 | Curran | 33/203.11 |
| 2,560,571 A | | 7/1951 | Hawkins | |
| D177,541 S | * | 4/1956 | Wambach, Jr. | 33/833 |
| 3,128,559 A | | 4/1964 | Winter | |
| 3,645,002 A | | 2/1972 | Hefti | |
| 3,758,957 A | | 9/1973 | Eskijian | |
| 4,132,001 A | | 1/1979 | Petrik | |
| 4,321,752 A | | 3/1982 | Kaufman | |
| 4,653,191 A | * | 3/1987 | Gasser | 33/833 |
| 4,894,920 A | | 1/1990 | Butler et al. | 33/203.11 |
| 5,205,046 A | | 4/1993 | Barnett et al. | 33/533 |
| 5,235,988 A | | 8/1993 | Johnson et al. | 128/774 |
| 6,035,729 A | * | 3/2000 | Weinmann | 33/203 |

* cited by examiner

*Primary Examiner*—G. Bradley Bennett
(74) *Attorney, Agent, or Firm*—Michael Sand; Michael R. Huber

(57) ABSTRACT

A manually operated device for measuring the height of a protrusion or raised area on the sidewalls of tires has a thin U-shaped body with a pair of spaced parallel legs and a cross member extending therebetween. A thin rigid metal scale is frictionally slidably mounted within a channel formed in the cross member and has a top edge which aligns with a flat top surface of the cross member at the start of a measuring procedure and has a bottom edge which lies in a plane extending between the free ends of the spaced legs. A stop bolt extends through an elongated slot formed in the scale for limiting the sliding movement of the scale within the channel. Engagement of the bottom edge of the scale with the protrusion automatically moves the scale in the channel to provide the height of the protrusion by measurement indicia on the scale aligning with a top surface of a raised central portion of the cross member.

14 Claims, 3 Drawing Sheets

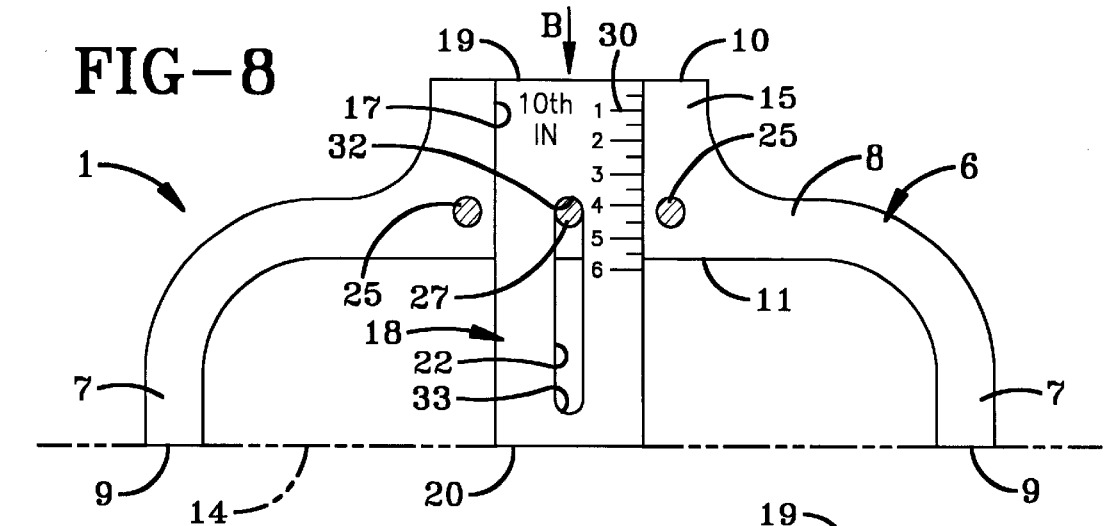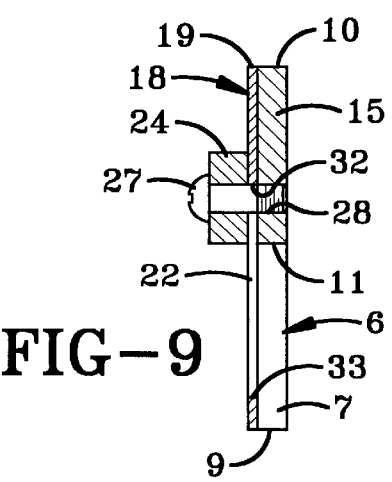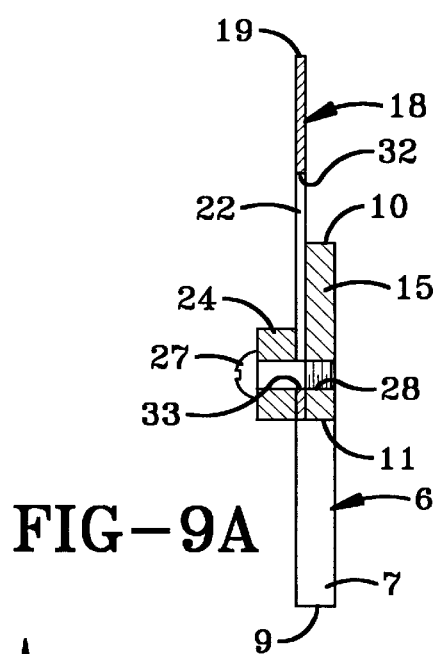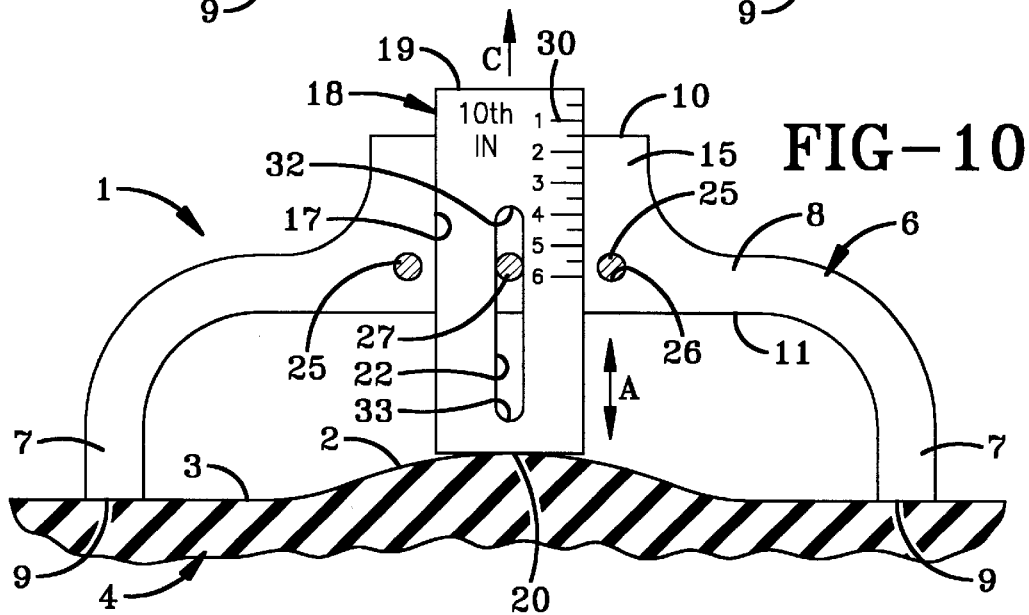

DEVICE FOR MEASURING SURFACE PROJECTIONS ON SIDEWALLS OF PNEUMATIC TIRES

BACKGROUND OF THE INVENTION

1. Technical Field

The invention relates to a measuring device for measuring raised areas on the sidewalls of pneumatic tires. More particularly, the invention relates to a very simple lightweight measuring device which automatically indicates the height of a projection on the inside or outside of the sidewall of a pneumatic tire by engagement of a sliding scale engaging the projection.

2. Background Information

Pneumatic tires, and in particular larger truck and bus radial tires, occasionally will produce a bulge or bump on the outer sidewall surface adjacent the location of the inner body ply splice when inflated. Also, such projections occasionally can occur on the inside of the sidewall before inflation. It has been determined that if this projection exceeds a certain limit above the sidewall surface, the tire should not be used. However, most of these projections do not appear until the tire has been shipped to an installation site and only after the tire is inflated for installation on a vehicle. Thus, it has been difficult for an installer without sophisticated measuring equipment, to easily determine if the projection exceeds the recommended limits since the same is not readily ascertainable by visual sight and/or feel.

Various gauges have been developed for measuring various bumps, projections and/or depressions in tires, most of which use some type of moving member. Examples of such devices are shown in U.S. Pat. Nos. 2,560,571; 3,128,559; 3,645,002; 3,758,957; 4,321,752; 4,653,191; 4,894,920; 5,205,046 and 5,235,988. However, most of these prior art devices are relatively bulky and expensive for producing a sufficient number of them for the service personnel in tire installation shops. Likewise, such devices can be misplaced, lost or damaged at such tire installation sites and are not of sufficient size and weight to be easily carried by a tire installer, such as in a shirt pocket.

Therefore, the need exists for an extremely simple, lightweight, inexpensive device or gauge which can be carried by a tire installer enabling him to rapidly determine the height of any projection appearing on the sidewall of the tire before or after it has been inflated to ensure that it is within the acceptable limits.

SUMMARY OF THE INVENTION

The invention provides a height measuring gauge or device formed of an extremely lightweight material such as plastic or aluminum, having a single moving slide or scale for automatically indicating the height of a projection when the device is placed on the sidewall of the tire adjacent the projection.

The device of the invention comprises a U-shaped body having a cross member in which a height indicating scale is slidably mounted for movement between spaced legs of the body upon engagement of a lower end of the sliding scale with the projection.

Another aspect of the invention preferably provides a device in which a slot is formed in the sliding height indicating scale that is engageable with a fixed pin to easily position the scale at the correct location when measuring the sidewall projection without requiring complicated calculations and without the use of springs which are subject to changing characteristics.

Another feature of the invention is to provide such a simple, lightweight, inexpensive device having only a single moving part, which is relatively maintenance free and which eliminates recalibration at any time throughout its life, yet which provides an accurate reading immediately upon placement of the device adjacent a sidewall projection.

The foregoing advantages, construction and operation of the present invention will become readily apparent from the following description and accompanying drawings.

BRIEF DESCRIPTION OF THE DRAWINGS

FIG. 8 is a front elevational view similar to FIG. 4 with the scale retaining bar removed therefrom;

FIG. 9 is a sectional view taken on line 9—9, FIG. 4;

FIG. 9A is a view similar to FIG. 9 with the sliding scale in its uppermost position; and FIG. 10 is a view similar to FIG. 8 showing the device measuring the height of a sidewall projection.

Similar numerals refer to similar parts throughout the drawings.

DESCRIPTION OF THE PREFERRED EMBODIMENT

Figure 1:
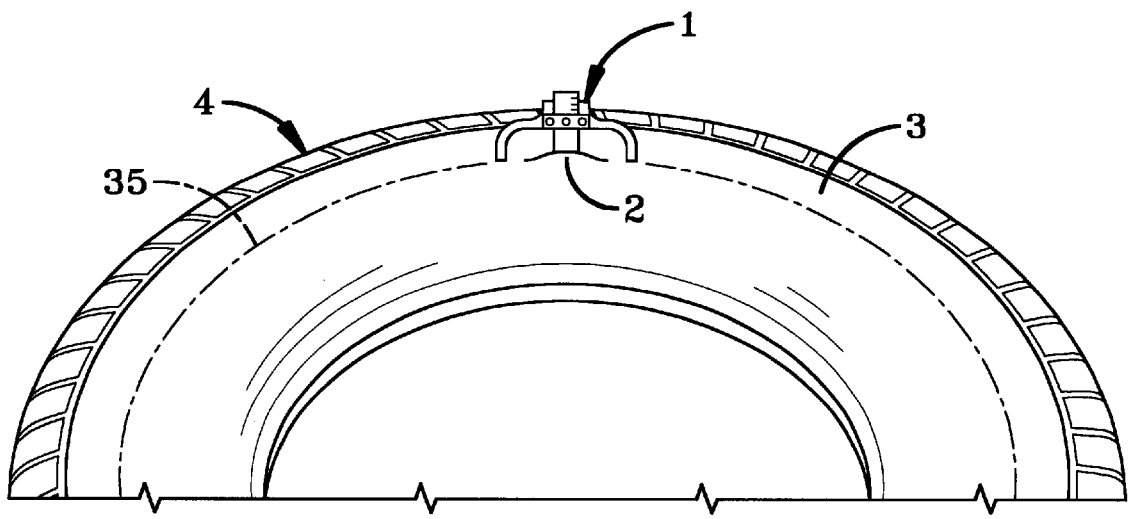
FIG. 1 is a diagrammatic perspective view of a portion of a pneumatic tire with the device of the present invention measuring a protrusion thereon.
Figure 2:
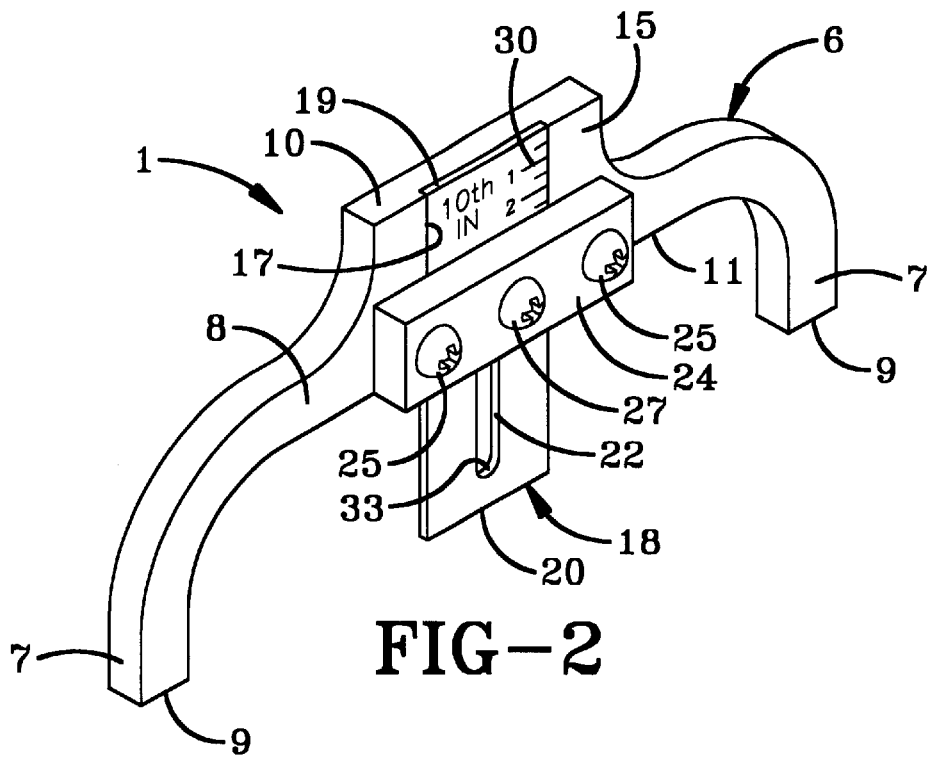
FIG. 2 is an enlarged perspective view of the device of the present invention.
Figure 3:
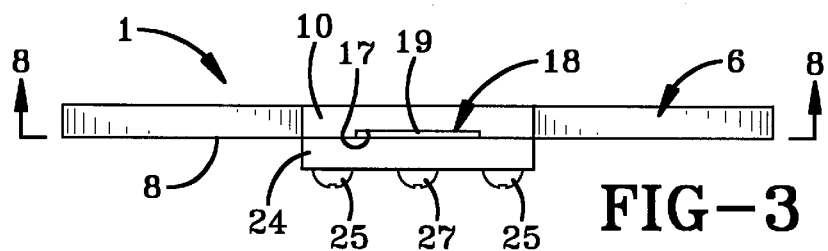
FIG. 3 is a top plan view of FIG. 2.
Figure 4:
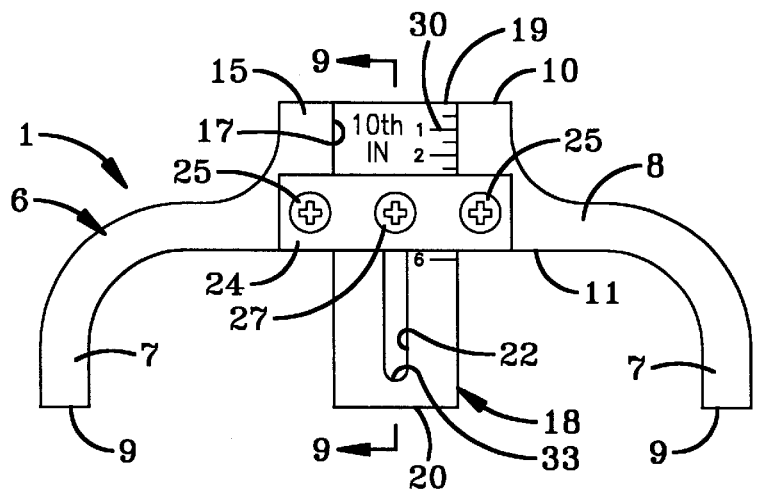
FIG. 4 is a front elevational view of FIG. 2.
Figure 5:
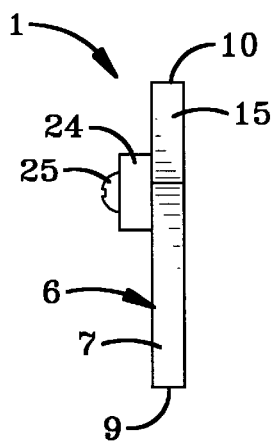
FIG. 5 is a right side elevational view of FIG. 4.

The improved device of the present invention is indicated generally at 1, and is shown in FIG. 1 measuring a raised area or projection 2 on a sidewall 3 of a pneumatic tire indicated generally at 4. Device 1 includes a generally U-shaped one-piece body indicated generally at 6, formed of a lightweight material, such as plastic or aluminum, and includes a pair of spaced legs 7 connected by a cross member 8. Legs 7 terminate in free ends 9 and cross member 8 has an upper flat planar surface 10 and a lower flat bottom surface 11 extending between legs 7. As shown particularly in FIG. 8, free ends 9 of legs 7 have a flat planar configuration and are aligned in a common plane 14. Cross member 8 has a raised central portion 15 which terminates in flat top surface 10 referred to above.

Figure 6:
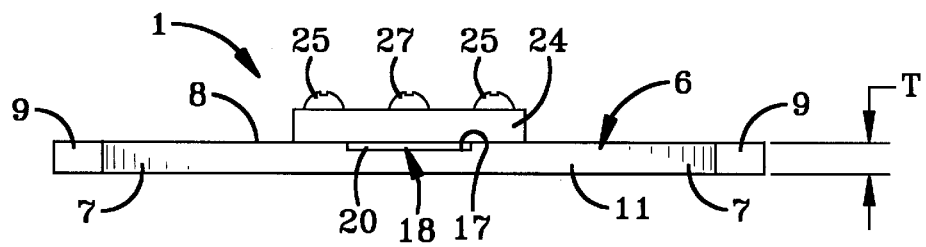
FIG. 6 is a bottom plan view of FIG. 4.

As shown in the drawings, legs 7 and cross member 8 have a uniform thickness T (FIG. 6) which is relatively thin with respect to the length and height of device 1. However, the particular material from which body 6 is formed is sufficiently rigid to prevent any movement of legs 7 with respect to cross member 8.

A channel 17 is formed in cross member 8 and extends through central portion 15, and extends parallel with legs 7. Channel 17 has a rectangular configuration formed by three walls of central portion 15 and has an open side enabling it to be formed, such as by machining, easily therein. A height indicating scale indicated generally at 18, is frictionally slidably mounted within channel 17 for reciprocal sliding movement as shown by arrow A (FIG. 10), parallel with and between spaced legs 7. Scale 18 preferably is formed of a thin rigid metal strip having flat top and bottom ends 19 and 20 respectively, and is formed with a slot 22 extending partially throughout the longitudinal length thereof. Channel 17 preferably has a depth substantially equal to the thickness of scale 18 to eliminate protruding areas. In the preferred embodiment one side of scale 18 as shown in FIG. 10, will be marked in inches, for example 1/10 inch segments, with the opposite side (FIG. 7) being marked in millimeters.

Scale 18 is maintained in channel 17 which has a configuration complementary to channel 17, by a retaining bar 24. Bar 24 extends across channel 17 and is mounted on cross member 8 by a pair of threaded bolts 25 which are threadably engaged within threaded holes 26 formed in cross member 8. However, it is readily understood that other types of fasteners or even an adhesive, could be used instead of bolts 25 without affecting the concept of the invention.

A stop bolt 27 extends from bar 24 and into a threaded hole 28 formed in cross member 8 and through slot 22. Stop bolt 27 could be other types of pins, rods or similar member which is mounted in a fixed position and extends through slot 22. Scale 18 has a plurality of height indicating indicia 30 marked thereon which provides an instant reading to an individual using device 1 when placed adjacent a protrusion 2 on a tire sidewall 3 as discussed further below. In accordance with one of the features of the invention, slot 22 has a particular length and terminates in an upper end 32 and a lower end 33 (FIGS. 8 and 10) in order to provide for an extremely simple and error free use of device 1.

An operator to use device 1 merely presses downwardly on flat top end 19 of scale 18 as shown by arrow B in FIG. 8, slidably moving scale 18 along channel 17 until stop bolt 27 reaches the upper limit or end 32 of slot 22 (FIG. 9). In this start position, top end 19 of scale 18 aligns with flat top surface 10 of raised central portion 15 of cross member 8. The length of scale 18 provides that lower end 20 lies in plane 14 extending between bottom free ends 9 of legs 7 when stop bolt 27 engages slot end 32.

Figure 7:
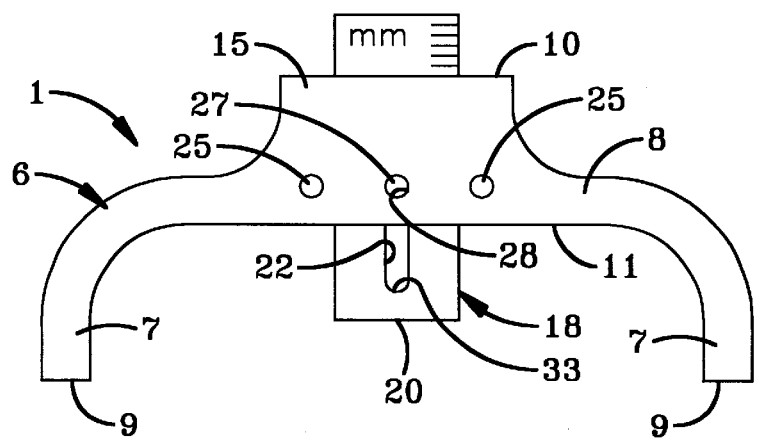
FIG. 7 is a rear elevational view of FIG. 4 with the scale partially raised.

The operator then places legs 7 on opposite sides of projection 2 along an imaginary circumferential line 35 as shown in FIGS. 1 and 10, so that leg ends 9 are in the same general plane of the tire sidewall as shown in FIG. 1 which is the general plane in which projection 2 extends upwardly therefrom. Upon placing legs 7 against sidewall 3, lower end 20 of scale 18 will engage the top of projection 2 automatically moving scale 18 upwardly in the direction of arrow C (FIG. 10) immediately providing the operator with a height measurement by viewing along flat top surface 10 of cross member 8. For example, as shown in FIG. 10, the height is automatically shown as 0.15 inches. However, if desired, the operator can read millimeters on the opposite side as shown in FIG. 7. Thus, the operator merely places device 1 so that legs 7 straddle projection 2 along a circumferential line which automatically moves scale 18 to provide an instantaneous height indication easily seen by the operator by viewing along flat planar surface 10, either in inches or millimeters.

The length of slot 22 and the location of lower end 33 thereof, preferably ensures that bottom end 20 of scale 18 aligns with bottom surface 11 of cross member 8 as shown in FIG. 9A, when slot end 33 engages stop bolt 27, to eliminate any portion of scale 18 from extending below surface 11, although the same is not required for the operation of gauge 1. Again, the most important relationship is the position shown in FIG. 8, wherein when scale 18 is in the lowermost position, top end 19 will align with surface 10 and bottom end 20 will lie in plane 14.

Accordingly, improved device 1 provides for an extremely simple, easily operated device and method of use which does not require constant recalibration or possible false readings as can occur with prior devices using springs, and instantaneously provides an easily read visual indication of the height of the projection when the operator places the device over the projection. The operator needs to perform only one function in order to get the desired reading, that is, slidably moving scale 18 to its start position as shown in FIG. 8. Likewise, the size and configuration of device 1 is such that it will easily fit in the breast pocket of the installer's shirt for easy access upon inflating a tire prior to placing it on a vehicle. In the preferred embodiment, the distance between legs 7 is approximately 2½ inches, with the height being approximately 1⅛ inches, in which legs 7 and cross member 8 have a thickness of approximately ⅛ inch. Thus, device 1 is a relatively thin, flat, rigid member which is extremely small and lightweight, yet provides the desired results in an extremely simple, effective and efficient manner.

While the embodiments of the invention have been described, the invention is not limited thereto.

I claim:

1. A device for measuring a raised area in the sidewall of a tire, including:
    a body having a generally U-shaped configuration with a pair of spaced legs and a cross member extending therebetween, each of said legs terminating in a free end adapted to be placed on the sidewall of the tire adjacent the raised area, and a channel formed in said cross member;
    a scale slidably mounted within the channel for movement generally parallel with the spaced legs to indicate the height of the raised area, said scale being a substantially thin flat rigid strip having measurement indicia thereon and terminating in first and second ends;
    a slot formed in and extending partially along the scale and terminating in first and second ends; and
    a fixed stop member on the body extending through the slot in the scale and engagable with the first end of the slot to position the scale whereby the second end of the scale lies in a common plane with the free ends of the legs, whereby said scale is slidably moved in the channel a distance equal to the height of the raised area upon the second end of the scale engaging the raised area of the tire.

2. The device defined in claim 1 in which the U-shaped body is a one-piece member formed of aluminum.

3. The device defined in claim 1 in which the U-shaped body is a one-piece member formed of a rigid plastic.

4. The device defined in claim 1 in which the pair of legs are spaced approximately 2½ inches apart.

5. The device defined in claim 1 in which the U-shaped body has a generally thin flat configuration.

6. The device defined in claim 5 in which the U-shaped body in a one-piece member having a thickness of approximately ⅛ inch.

7. The device defined in claim 1 in which the scale is a thin rigid metal strip having opposite flat sides.

8. The device defined in claim 7 in which the channel has a rectangular configuration formed by three walls and an open side; and in which a retaining member is mounted on the cross member and extends across the open side of the channel to assist in slidably mounting the scale in said channel.

9. The device defined in claim 8 in which the channel has a depth substantially equal to the thickness of the scale.

10. The device defined in claim 7 in which one of the measurement indicators on one side of the scale is in inches and on the other side in millimeters.

11. The device defined in claim 1 in which the cross member has a flat top surface; and in which the first end of the scale aligns with said flat top surface of the cross member when the stop member engages the second end of the slot.

12. A method for measuring the height of a protrusion in the sidewall of a tire comprising the steps of:

provisioning a body having a pair of spaced legs and a scale slidably mounted in a channel formed in a cross member of the body;

providing a slot in the scale;

providing a stop member on the body which extends into the slot and engages an end of the slot when a first end of the scale aligns with free ends of the spaced legs;

slidably moving the scale until the stop member engages the end of the slot whereby the first end of the scale aligns with the free ends of the spaced legs;

moving the body towards the sidewall of the tire with the protrusion being measured located therebetween;

pressing the first end of the scale against the protrusion substantially moving the scale along the channel until the free ends of the spaced legs engage the sidewall in a straddling position with respect to the protrusion; and reading calibrated indicia on the scale which aligns with a top surface of the cross member to obtain the height of the protrusion.

13. The method defined in claim 12 including the step of aligning a second end of the scale with the top surface of the cross member before moving the U-shaped body toward the sidewall.

14. The method defined in claim 12 including engaging the spaced legs on an imaginary circumferential line on the tire sidewall which extends through the highest point of the protrusion.

* * * * *